(12) United States Patent
Matsumura et al.

(10) Patent No.: US 6,489,996 B1
(45) Date of Patent: Dec. 3, 2002

(54) MOVING-PICTURE DECODING METHOD AND APPARATUS CALCULATING MOTION VECTORS TO REDUCE DISTORTION CAUSED BY ERROR PROPAGATION

(75) Inventors: Yasuko Matsumura, Tokyo (JP); Shigeru Fukunaga, Tokyo (JP); Toshihisa Nakai, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/401,276

(22) Filed: Sep. 23, 1999

(30) Foreign Application Priority Data

Sep. 25, 1998 (JP) .......................................... 10-271095

(51) Int. Cl.$^7$ ................................................ H04N 7/18
(52) U.S. Cl. ............. 348/416; 375/240.12; 375/240.16; 375/240.17
(58) Field of Search ..................... 375/240.11–240.29

(56) References Cited

U.S. PATENT DOCUMENTS 5,400,076 A * 3/1995 Iwamura ..................... 348/416
5,442,400 A * 8/1995 Sun et al. .................... 348/402
5,614,958 A * 3/1997 Shikakura ................... 348/616
5,737,022 A * 4/1998 Yamaguchi et al. ........ 348/416
6,285,715 B1 * 9/2001 Ozcelik et al. ......... 375/240.27

FOREIGN PATENT DOCUMENTS

JP          09200743          7/1997

* cited by examiner

*Primary Examiner*—Andy Rao
(74) *Attorney, Agent, or Firm*—Rabin & Berdo, P.C.

(57) ABSTRACT

A moving picture coded by inter-frame coding, with motion compensation, is decoded by an apparatus that stores at least two previously decoded frames, together with information identifying any erroneous parts of the previously decoded frames. The current frame is decoded with reference to a predicted frame assembled from decodable parts of the previous frames. When a motion vector points to a non-decodable part of a previous frame, it is extended farther back to a decodable part of an earlier frame. The extension can be made linearly, or by using previous motion vectors. Picture distortion caused by error propagation is thereby reduced.

12 Claims, 13 Drawing Sheets

FIG. 2
PRIOR ART
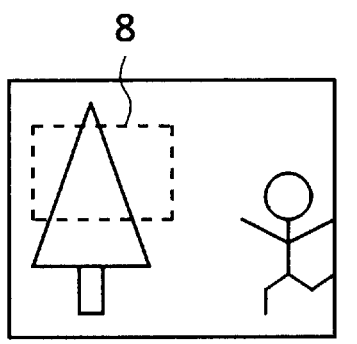
FRAME n−1
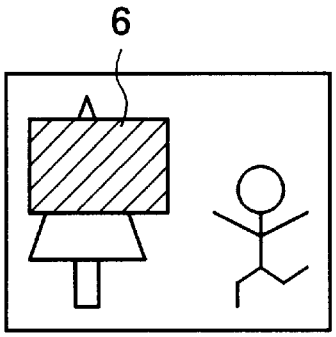
FRAME n
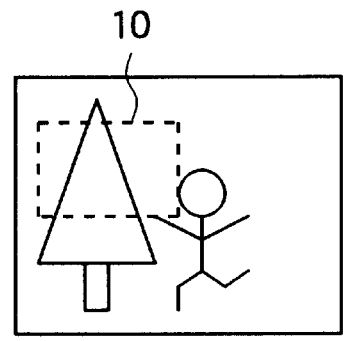
FRAME n+1
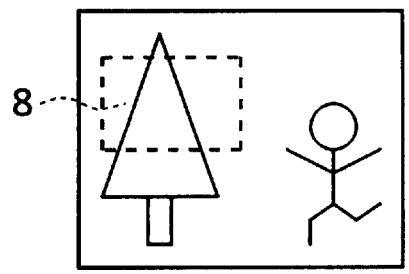
FRAME n

MOVING-PICTURE DECODING METHOD AND APPARATUS CALCULATING MOTION VECTORS TO REDUCE DISTORTION CAUSED BY ERROR PROPAGATION

BACKGROUND OF THE INVENTION

The present invention relates to a method and apparatus for decoding moving pictures coded by inter-frame coding with motion compensation, and more particularly to a method that reduces picture distortion caused by error propagation.

Moving pictures generate very large amounts of information. When transmitted over digital communication channels, they are usually compressed to reduce their data size by removing redundant information. Inter-frame coding is a method of removing redundancy in the temporal direction by coding the difference between the current frame and the preceding frame. Motion compensation is a refinement of inter-frame coding in which each part of the current frame is coded with reference to the nearby part it most closely resembles in the preceding frame, the location of this nearby part being indicated by a motion vector. Standard methods of inter-frame coding are given in recommendation H.263 of the Telecommunication Standardization Sector of the International Telecommunication Union (ITU-T), and in the phase-two standard of the Moving Picture Experts Group (MPEG-2), which has been adopted by the International Standards Organization (ISO).

In the H.263 and MPEG-2 systems, a frame is divided into blocks of a certain size, referred to as macroblocks because they are made up of smaller blocks of luminance and chrominance information. A typical size is a square measuring sixteen picture elements or pixels horizontally and vertically. The macroblocks are further grouped into units variously termed groups of blocks (GOBs), slices, or video packets. The term 'slice' will be used herein to refer to any such grouping of macroblocks. FIG. 1 shows an example of a macroblock 2 and slice 4.

The coding process includes the use of variable-length codewords. Variable-length code synchronization words are inserted between the slices, so that if an error or data dropout prevents the boundaries of the variable-length codewords from being identified, correct decoding can resume in the next slice.

When a data error or dropout is detected, an attempt may be made to conceal the error by substituting data from a previous frame. In one known system, the macroblock or slice in which the error or dropout occurred is replaced with the corresponding macroblock or slice in the preceding frame. In FIG. 2, for example, erroneous or missing data 6 in frame n are replaced with data 8 from the same part of frame n−1, which could be decoded correctly. The corresponding part of frame n+1 is then decoded with reference to the replacement data 8. In this case, since no motion occurs in the relevant parts 6, 8, 10 of frames n−1, n, and n+1, the error is completely concealed.

A known decoding apparatus employing this method, shown in FIG. 3, comprises a bit-stream decoder 100, a prediction-error decoder 101, a motion-vector decoder 102, a picture predictor 103, an adder 104, a decoded-picture memory 105, and an error reporter 106.

The bit-stream decoder 100 in FIG. 3 decodes a received bit stream comprising variable-length codewords, and classifies the decoded values as transform coefficient information or motion-vector information. If it finds a variable-length codeword not listed in the corresponding coding table, or finds a synchronization codeword in an impossible location, it notifies the error reporter 106.

The prediction-error decoder 101 decodes the transform coefficient information to obtain prediction error values. For moving pictures coded according to the H.263 or MPEG-2 standard, for example, the prediction-error decoder 101 has the structure shown in FIG. 4, comprising a dequantizer 107 and an inverse transform processor 108. The dequantizer 107 obtains a so-called direct-current (DC) coefficient representing a mean value in a block or macroblock, and various coefficients representing higher spatial frequency components. If the DC coefficient is not within a certain range of values, the dequantizer 107 reports an error to the error reporter 106. The inverse transform processor 108 performs an inverse discrete cosine transform on the dequantized coefficients.

The motion-vector decoder 102 decodes the motion-vector information supplied by the bit-stream decoder 100 to obtain motion vectors. If the motion-vector decoder 102 detects an error, such as a motion vector pointing outside the frame, it notifies the error reporter 106.

The picture predictor 103 constructs a predicted frame by reading data from the preceding frame, which is stored in the decoded-picture memory 105, according to the motion vectors.

The adder 104 adds the prediction error values obtained by the prediction-error decoder 101 to the predicted frame obtained by the picture predictor 103 to obtain a decoded frame. The decoded frame is output as one frame of the decoded moving picture, and is stored in the decoded-picture memory 105, for use in decoding the next frame. The decoded-picture memory 105 has a capacity of only one frame.

If an error is detected by the bit-stream decoder 100, prediction-error decoder 101, or motion-vector decoder 102, the error reporter 106 directs the picture predictor 103 to read the slice in the preceding frame corresponding to the erroneous slice in the current frame from the decoded-picture memory 105, and insert this slice into the predicted frame supplied to the adder 104, replacing the erroneous slice. The error reporter 106 also directs the adder 104 not to add any prediction error values to the inserted slice. In the decoded frame, accordingly, the erroneous slice is replaced by the corresponding slice from the preceding frame.

A problem with this direct replacement scheme is that when motion is present, the inserted slice is visibly offset from the rest of the picture. If the motion vectors are large, the picture may be badly distorted. Furthermore, due to inter-frame coding, the distortion is passed on to subsequent frames, often becoming worse in the process. This is illustrated in FIG. 5, in which an error occurs in a part 12 of frame n with large motion vectors. When this part is replaced by the corresponding part 14 from the preceding frame (n−1), the running figure appears to be torn apart, and the situation worsens in the next frame (n+1), as the replacement data reappear, without moving, in the corresponding part 16.

SUMMARY OF THE INVENTION

An object of the present invention is to reduce the distortion caused by error propagation in the transmission of moving pictures.

According to the present invention, when a moving picture coded by inter-frame coding with motion compensation is decoded, for each frame, at least two previously decoded frames of the moving picture are stored, together with information identifying any parts of these previously decoded frames that could not be decoded correctly. When the current frame is decoded, for each decodable part of the current frame, a motion vector indicating a correctly decoded part of one of the previous frames is calculated. A predicted frame is constructed by piecing together the parts indicated by the calculated motion vectors, and the current frame is decoded with reference to the predicted frame.

The calculation of the motion vector preferably starts from a received motion-vector value indicating a part of the most recent previously decoded frame. If this indicated part could not be decoded correctly, the motion vector is extended back into the next-most-recent previous frame, by multiplying the motion-vector value by a factor proportional to the additional elapsed time, for example, or by using stored values of previous motion vectors to retrace past motion.

BRIEF DESCRIPTION OF THE DRAWINGS

In the attached drawings:

FIG. 2 illustrates error concealment;

DETAILED DESCRIPTION OF THE INVENTION

Figure 1:
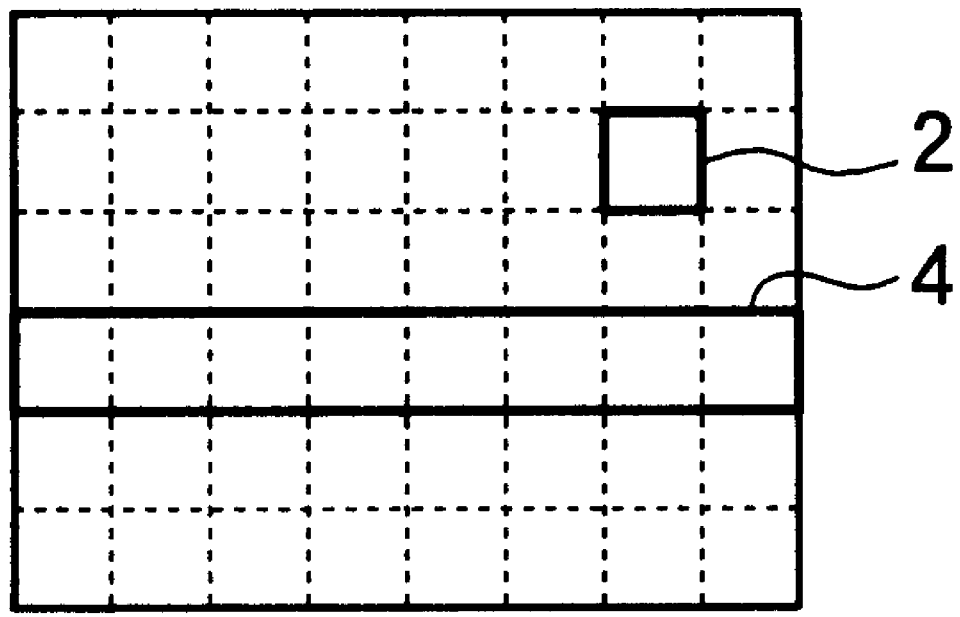
FIG. 1 illustrates a macroblock and a slice.
Figure 3:
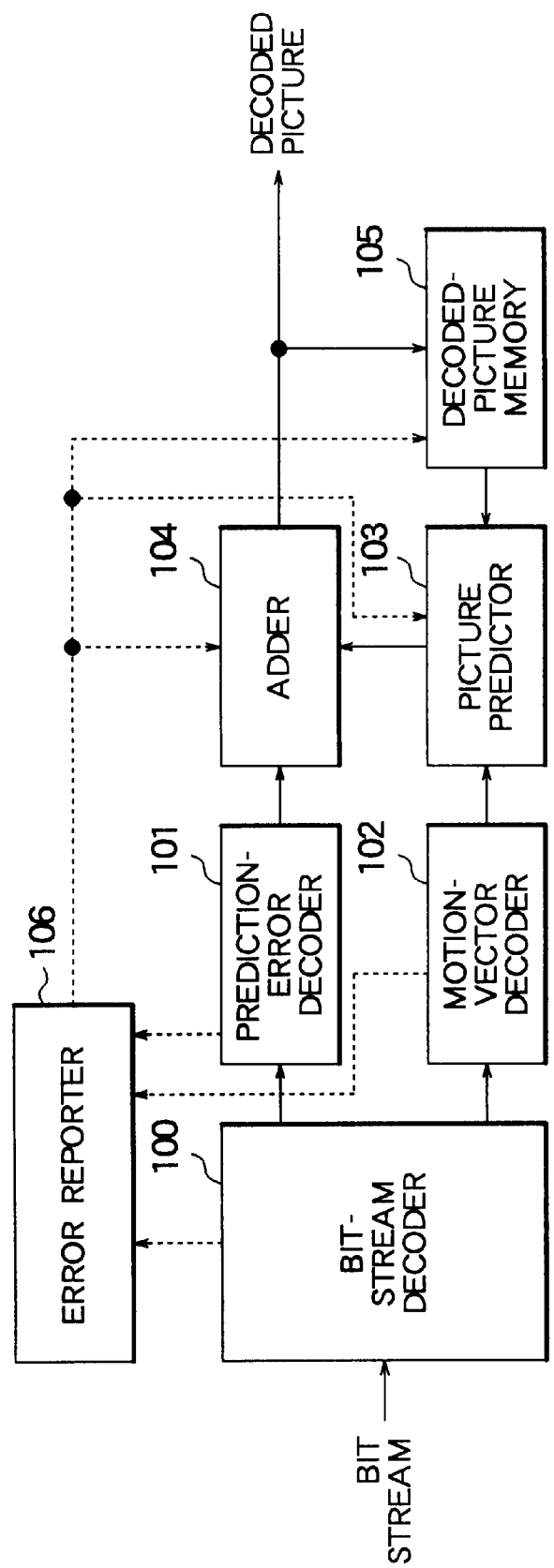
FIG. 3 illustrates a conventional decoding apparatus.
Figure 4:
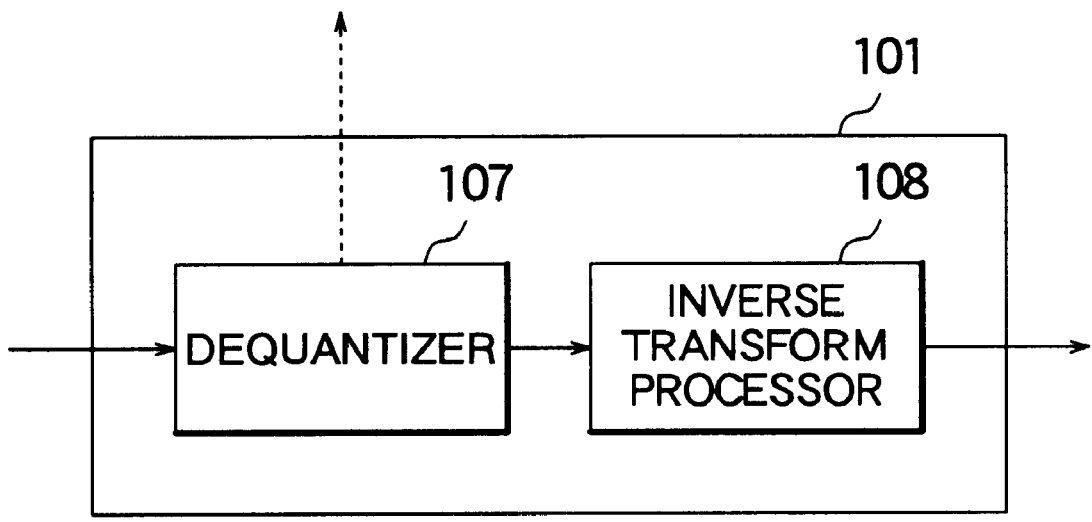
FIG. 4 shows the internal structure of the prediction-error decoder in FIG. 3.
Figure 5:
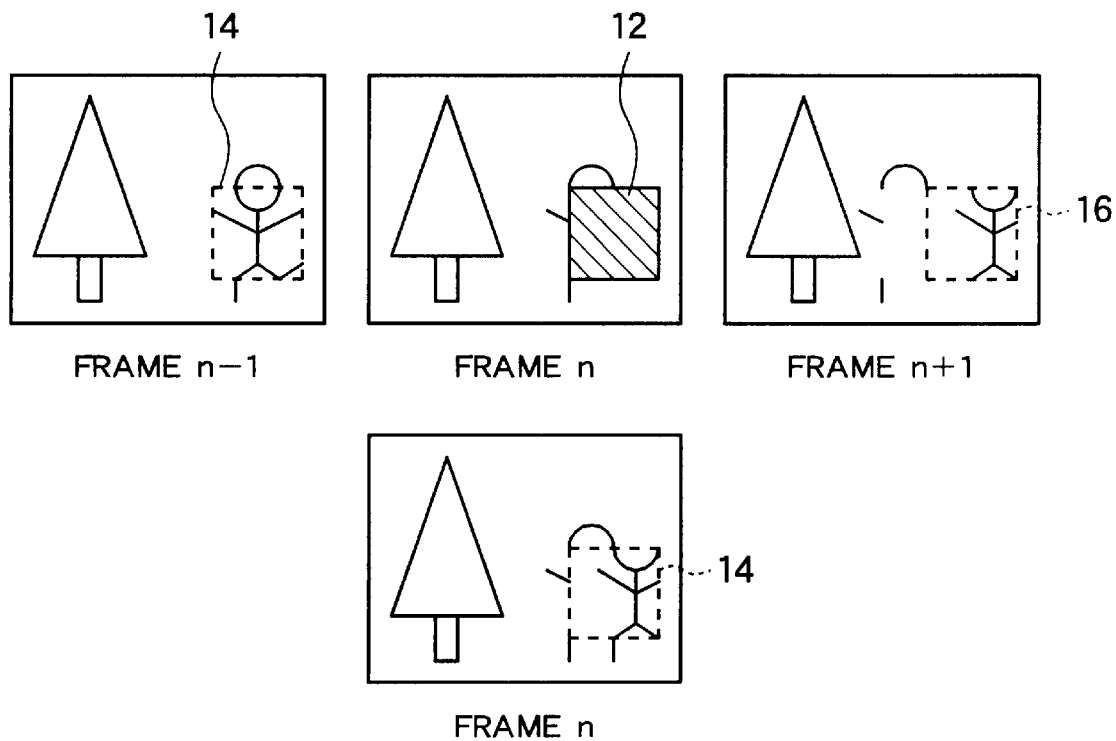
FIG. 5 illustrates distortion caused by error propagation in the apparatus in FIG. 3.

Embodiments of the invention will be described with reference to the attached drawings, in which like parts are indicated by like reference characters.

1st Embodiment

Figure 6:
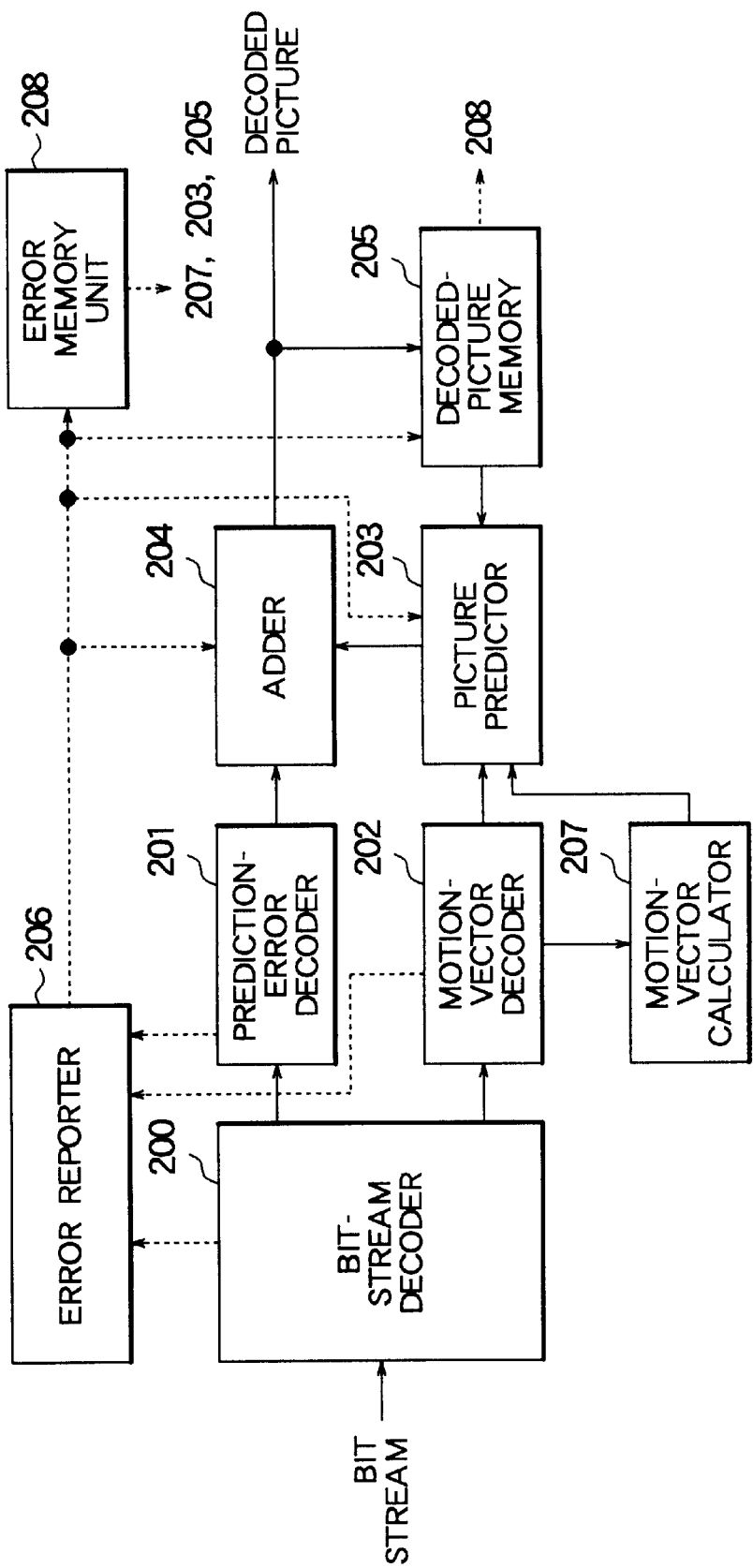
FIG. 6 is a block diagram of a first embodiment of the invented decoding apparatus.

Referring to FIG. 6, the first embodiment comprises a bit-stream decoder 200, a prediction-error decoder 201, a motion-vector decoder 202, a picture predictor 203, an adder 204, a decoded-picture memory 205, an error reporter 206, a motion-vector calculator 207, and an error memory unit 208.

The bit-stream decoder 200 receives a bit stream including variable-length codewords, with code synchronizing words inserted between slices. The bit-stream decoder 200 decodes the bit stream and interprets the decoded information, separating transform-coefficient information from motion-vector information. If the bit-stream decoder 200 finds an error, such as a codeword not listed in the relevant coding table, or a synchronizing word where none ought to occur, it sends an error detection signal to the error reporter 206.

The prediction-error decoder 201 performs an inverse discrete cosine transform, for example, to convert the transform-coefficient information to a set of prediction error values. The prediction-error decoder 201 also checks the transform coefficients, and sends the error reporter 206 an error detection signal if any coefficient has an impossible value.

The motion-vector decoder 202 decodes the motion-vector information to obtain motion vectors indicating the location of the block in the previous frame from which each block in the current frame was predicted. The motion-vector decoder 202 also checks the motion vectors, and sends the error reporter 206 an error detection signal if a motion vector has an impossible value, such as a value pointing outside the frame.

The prediction-error decoder 201 and motion-vector decoder 202 both operate on one macroblock at a time.

When not notified of an error by the error reporter 206 or error memory unit 208, for each macroblock, the picture predictor 203 reads data for the immediately preceding frame from the decoded-picture memory 205, from the location in that frame indicated by the motion vector output by the motion-vector decoder 202, to construct a predicted macroblock. When notified of an error by the error memory unit 208, the picture predictor 203 reads data for a frame before the immediately preceding frame from the decoded-picture memory 205, from a location in that frame indicated by a motion vector supplied by the motion-vector calculator 207, to construct a predicted macroblock. When notified of an error by the error reporter 206, the picture predictor 203 reads the data for the slice in the immediately preceding image corresponding to the erroneous slice in the current image from the decoded-picture memory 205, and substitutes the data read from the decoded-picture memory 205 for the entire erroneous slice to obtain a predicted slice. The predicted macroblocks and slices combine to form an entire predicted frame.

The adder 204 adds the prediction error values output by the prediction-error decoder 201 to the predicted frame data output by the picture predictor 203 to obtain a decoded picture. When notified of an error by the error reporter 206, however, the adder 204 does not add prediction error values to the slice in which the error occurred. The decoded picture is output to a storage apparatus or display apparatus (not visible), and is also stored in the decoded-picture memory 205 for use in decoding subsequent frames.

Figure 7:
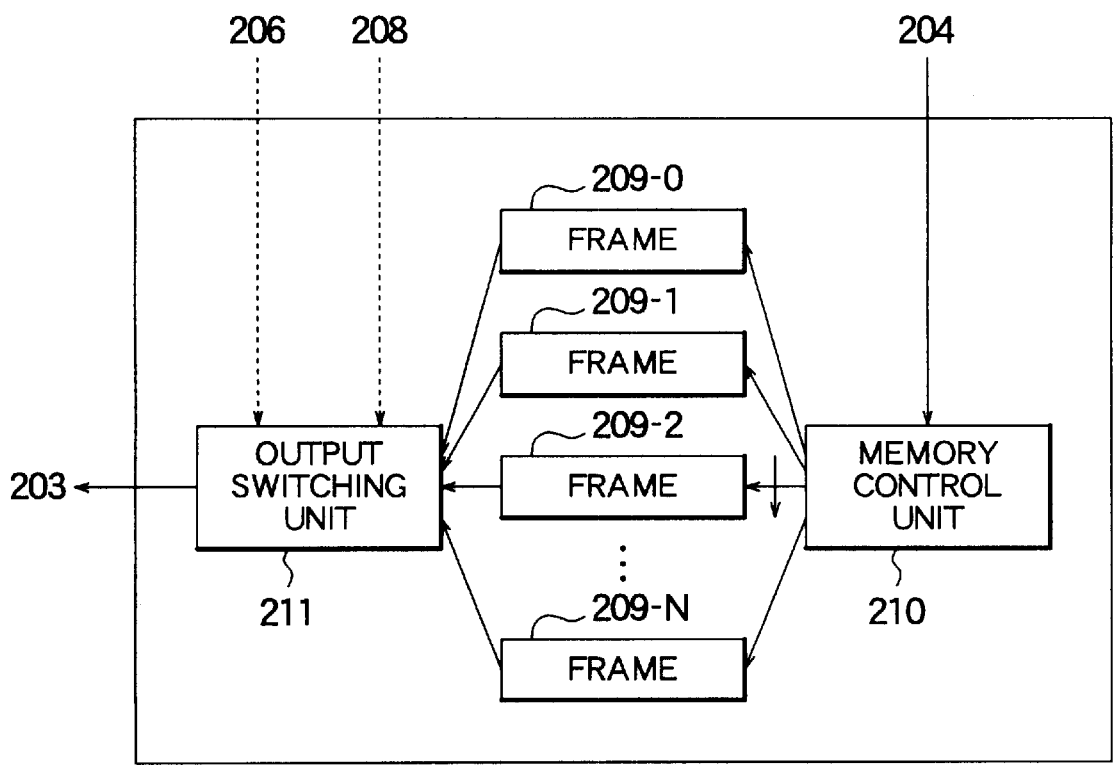
FIG. 7 shows the internal structure of the decoded-picture memory in FIG. 6.

The decoded-picture memory 205 stores a plurality of frames received from the adder 204. Referring to FIG. 7, the decoded-picture memory 205 has N+1 frame storage areas 209, numbered 209-0 to 209-N, where N is a positive integer. When a new frame is received from the adder 204, a memory control unit 210 selects an unused frame storage area 209 if one is available, or selects the frame storage area 209 storing the oldest frame if no frame storage area 209 is unused. The memory control unit 210 stores the new frame in the selected frame storage area 209, and sends information identifying the selected frame storage area 209 to the error memory unit 208. When the picture predictor 203 reads data from the decoded-picture memory 205, an output switching unit 211 selects the appropriate frame storage area 209 according to error signals received from the error reporter 206 and error memory unit 208. When notified of an error by the error reporter 206, for the entire erroneous slice, the output switching unit 211 selects the frame storage area 209 storing the immediately preceding frame. When notified of an error by the error memory unit 208 and not notified of an error by the error reporter 206, the output switching unit 211 selects the frame storage area 209 for each macroblock, or each pixel in each macroblock, according to an algorithm that will be described below. When not notified of an error by either the error reporter 206 or error memory unit 208, the output switching unit 211 selects the frame storage area 209 storing the immediately preceding frame.

The error reporter 206 notifies the picture predictor 203, decoded-picture memory 205, and error memory unit 208 of errors detected by the bit-stream decoder 200, prediction-error decoder 201, and motion-vector decoder 202. As described above, when an error is detected in a slice, the error reporter 206 instructs the decoded-picture memory 205 to output the corresponding slice from the previous frame to the picture predictor 203, instructs the picture predictor 203 to use the output slice as is, without considering motion vectors, and instructs the adder 204 to refrain from adding prediction-error values to the predicted data in the slice. The error reporter 206 also supplies the error memory unit 208 with decoded-picture error information comprising the position of the slice in which the error occurred, the frame number of the frame containing the erroneous slice, and information identifying the frame storage area 209 in the decoded-picture memory 205 in which that frame is stored. This information enables the error memory unit 208 to tell which part of which frame could not be decoded, and where that frame is stored. The frame number also indicates the temporal position of the frame.

The motion-vector calculator 207 receives a predicted-picture error signal from the error memory unit 208. The predicted-picture error signal specifies a reference frame to be used in place of the immediately preceding frame. The motion-vector calculator 207 uses the above-mentioned algorithm to calculate new motion vectors relating the current frame to the specified reference frame, taking into account the elapsed times since the specified reference frame and the immediately preceding frame.

The error memory unit 208 stores the decoded-picture error information received from the error reporter 206, and uses this information to recognize erroneous parts of the frames stored in the decoded-picture memory 205. To prevent the picture predictor 203 from referring to these erroneous parts, the error memory unit 208 sends the above-mentioned predicted-picture error signal to the motion-vector calculator 207, checks that the motion vectors calculated by the motion-vector calculator 207 point to error-free data, instructs the picture predictor 203 to use the calculated motion vectors, and instructs the decoded-picture memory 205 to supply the error-free data from the decoded-picture memory 205.

The elements shown in FIGS. 6 and 7 comprise semiconductor memory and logic circuits, detailed descriptions of which will be omitted.

Next, the operation of the first embodiment will be described.

Figure 8:
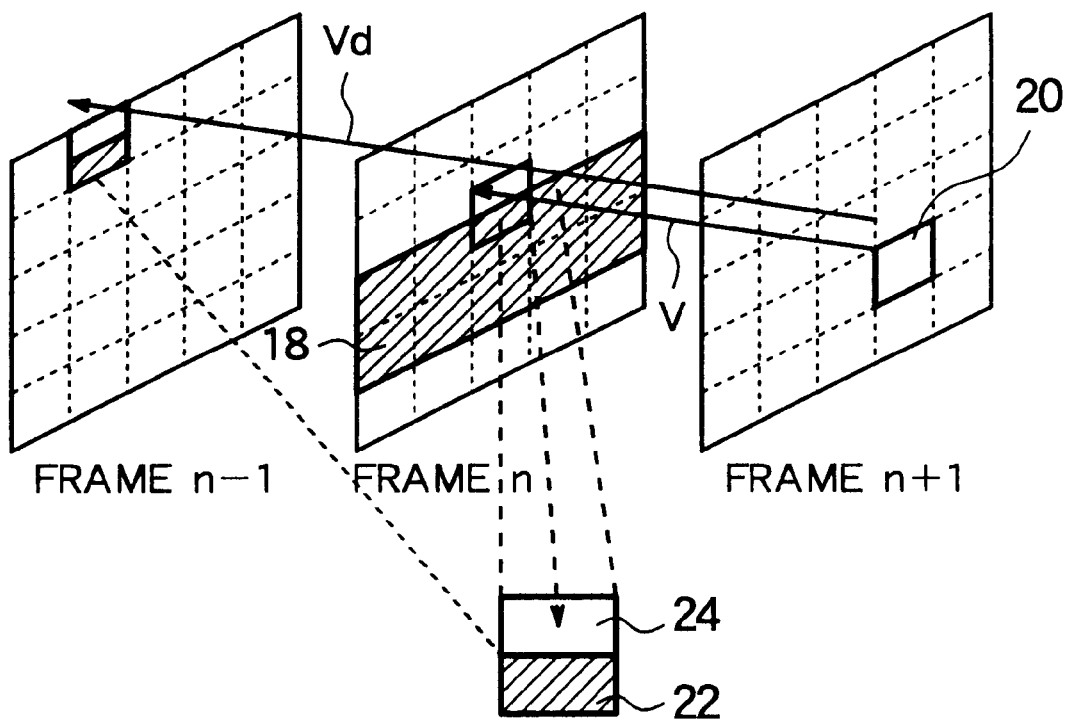
FIG. 8 illustrates the operation of the first embodiment.

FIG. 8 illustrates the general concept of the operation. The shaded part of frame n represents a slice that could not be decoded because of a transmission error. When the indicated macroblock 18 in the next frame (n+1) is decoded, its motion vector V points to an area disposed partly in the undecodable slice of frame n. The motion vector is therefore extended to a vector Vd pointing to an area in the preceding frame (n−1), and the shaded pixel values in frame n−1 are used in place of the undecodable pixel values 22 in frame n. The decodable part 24 of frame n is used without retrieving data from frame n−1. The indicated macroblock 20 in frame n+1 is thus decoded partly with reference to frame n and partly with reference to frame n+1.

If the pixels in frame n+1 indicated by the extended motion vector are also undecodable, then the motion vector is further extended to indicate an area in frame n+2. If the necessary pixels in frame n+2 are also undecodable, the motion vector is extended back to frame n+3, and if necessary further back until a set of decodable pixels is found. A formula for calculating the motion vector will be given below.

The operation will now be described in more detail, with reference to FIGS. 6, 7, and 9. The operation shown by the flowchart in FIG. 9 is performed separately for each pixel in the predicted macroblock being constructed by the picture predictor 203, when not notified of a decoding error by the error reporter 206.

Figure 9:
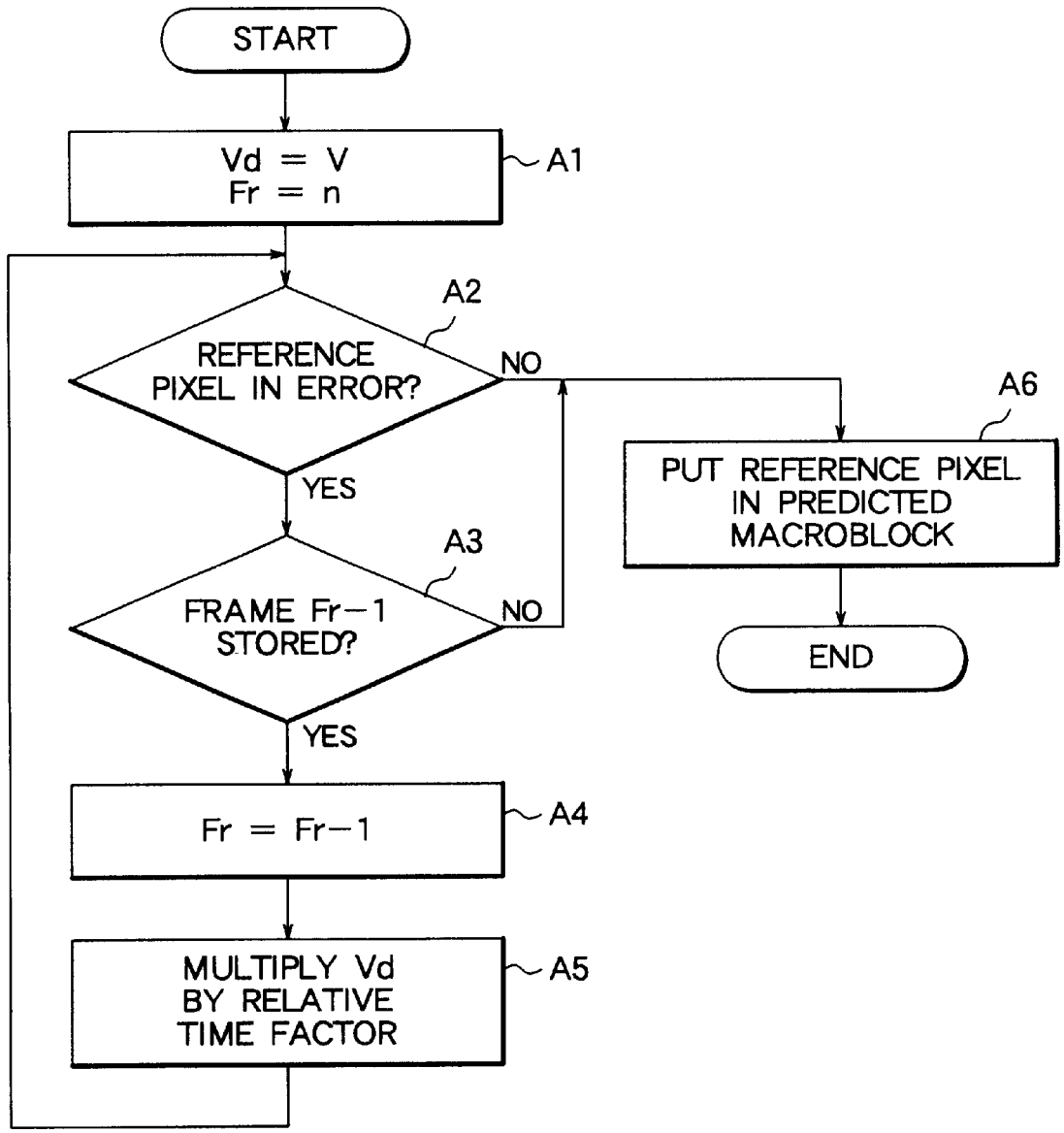
FIG. 9 is a flowchart further illustrating the operation of the first embodiment.

As a first step in the decoding of a pixel, the motion vector V supplied by the motion-vector decoder 202, pointing to a location in the preceding frame, is assigned as an initial value of the calculated motion vector Vd, and the frame number (n) of the preceding frame is assigned as an initial value of a reference frame number Fr (step A1 in FIG. 9). Next, the reference pixel in frame Fr indicated by the calculated motion vector Vd is checked, using the information stored in the error memory unit 208 (step A2). If this reference pixel is in error, that is, if it is part of a macroblock or slice that could not be decoded because of an error, the decoded-picture memory 205 is checked to see whether the frame preceding frame Fr is still stored in one of the frame storage areas 209 (step A3). If this frame (frame Fr−1) is still stored, it is made the new reference frame by subtracting one from Fr (step A4), and a new motion vector Vd, pointing to a location in this reference frame, is calculated as follows (step A5).

The calculation is carried out by converting frame numbers to corresponding times, and multiplying the motion vector V by a relative time factor. If TRd is the time of occurrence of the frame currently being decoded (frame n+1 in FIG. 8), TRp is the time of occurrence of the preceding frame (frame n), and TRr is the time of occurrence of the reference frame (frame Fr, now equal to frame n−1), then the motion vector Vd is given by the following equation.

$$Vd = \{(TRd-TRr)/(TRd-TRp)\}V$$

If frames occur at regular intervals and are numbered consecutively in ascending order, the frame numbers themselves can be used as time information. For the shaded pixels shown in FIG. 8, for which Fr is n−1, the calculation of Vd is carried out as follows.

$$Vd = \{((n+1)-(n-1))/((n+1)-n)\}V = 2V$$

After the new motion vector Vd has been calculated, the process returns to step A2 to check whether the new reference pixel is erroneous. The loop from step A2 to step A5 is repeated until a valid reference pixel is found, or until the frames stored in the decoded-picture memory 205 have been exhausted. That is, the loop is repeated until a 'no' result is obtained in step A2 or step A3.

When a 'no' result is obtained in step A2 or step A3, the value of the reference pixel indicated by motion vector Vd in frame Fr is placed in the predicted macroblock being constructed for use in decoding the current macroblock.

Steps A1 and A6 in FIG. 9 are carried out by the picture predictor 203. Step A2 is carried out by the picture predictor 203 and error memory unit 208; the picture predictor 203 attempts to read the reference pixel value from the decoded-picture memory 205, and the error memory unit 208 checks whether the reference pixel is valid or in error. Steps A3 and A4 are carried out by the error memory unit 208. Step A5 is carried out by the motion-vector calculator 207.

Figure 10:
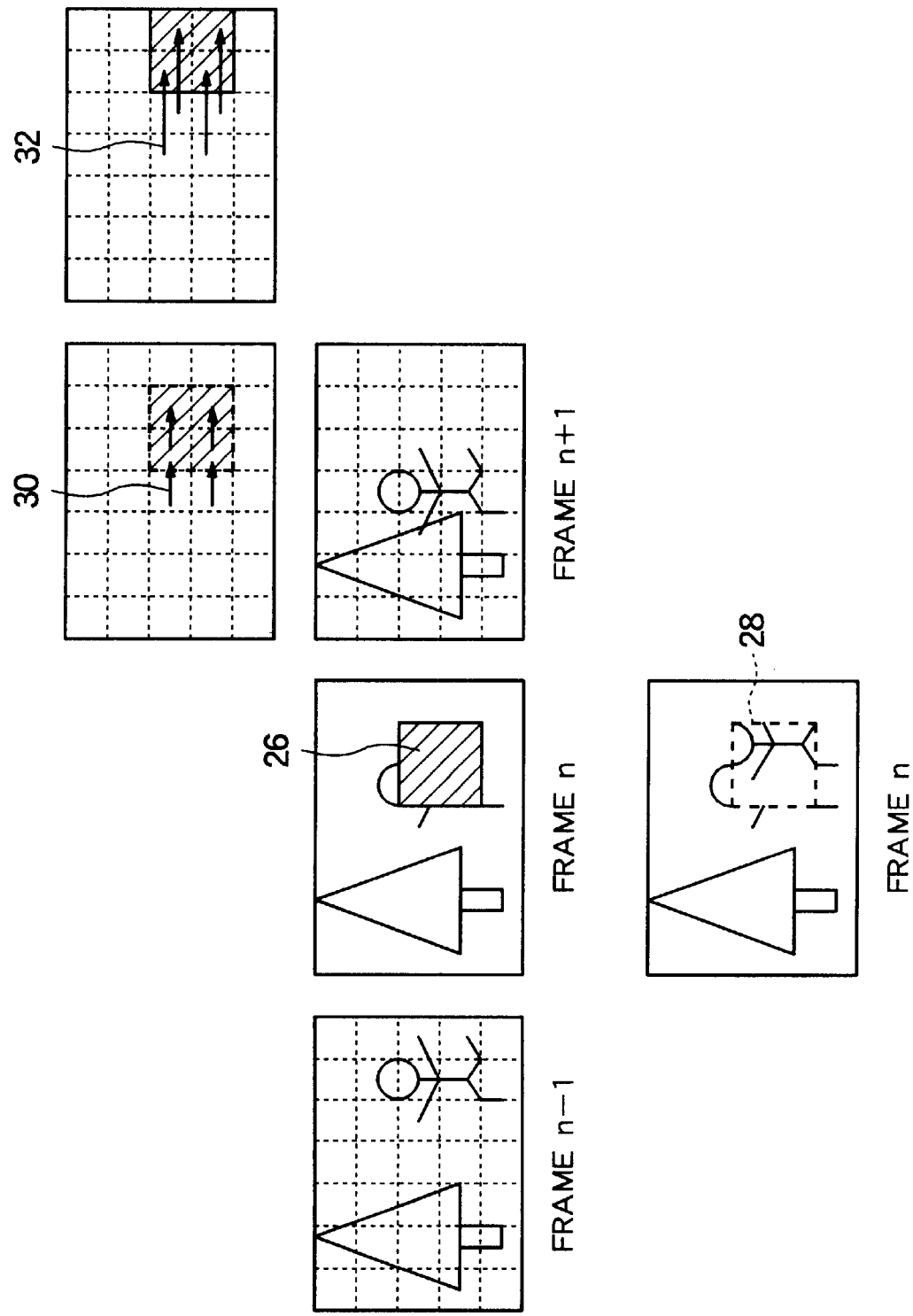
FIG. 10 illustrates the effect of the first embodiment.

FIG. 10 illustrates the effect of the first embodiment when an error makes part of frame n undecodable. The undecodable part 26 is indicated by hatching. The error reporter 206 receives an error signal from the prediction-error decoder 201 or motion-vector decoder 202 for this part, and instructs the picture predictor 203 to substitute the corresponding data from the preceding frame n−1. The adder 204 outputs this part 28 without adding prediction error values, resulting in a distorted picture, as indicated at the bottom of FIG. 10. The error memory unit 208 stores information indicating the frame number and location of the error.

When the next frame (n+1) is decoded, motion vectors pointing 30 into the erroneous part of frame n are replaced by doubled motion vectors 32 pointing into frame n−1, which is free of errors, and the error-free pixels from frame n−1 are used instead of the erroneous pixels from frame n to construct the predicted macroblocks from which frame n+1 is decoded. As a result, the distortion in frame n does not propagate into frame n+1. Frame n+1 is substantially free of distortion.

Over the duration of a few frames, much of the motion that occurs in a moving picture comprises substantially uniform linear motion of substantially unchanging objects. When an entire macroblock moves in this way, the first embodiment can completely prevent the propagation of distortion. In other cases, the distortion propagation may not be eliminated entirely, but in general, propagation effects are greatly reduced, as compared with the prior art.

2nd Embodiment

Figure 11:
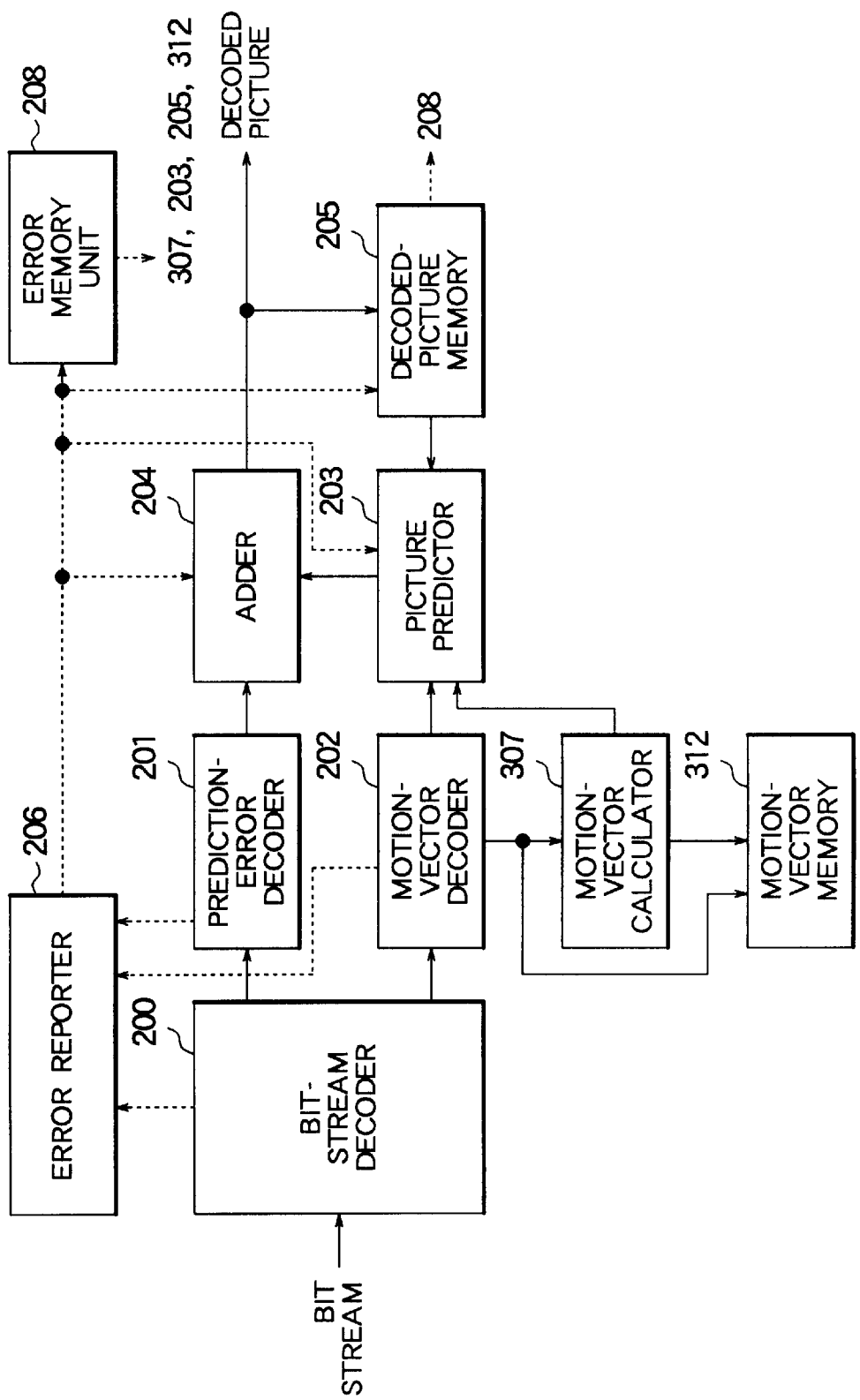
FIG. 11 is a block diagram of a second embodiment of the invented decoding apparatus.

Referring to FIG. 11, the second embodiment comprises the same bit-stream decoder 200, prediction-error decoder 201, motion-vector decoder 202, picture predictor 203, adder 204, decoded-picture memory 205, error reporter 206, and error memory unit 208 as in the first embodiment, a modified motion-vector calculator 307, and a motion-vector memory 312.

The motion-vector memory 312 stores the motion vectors output by the motion-vector decoder 202 and the motion vectors calculated by the motion-vector calculator 307, for as many frames as are stored in the decoded-picture memory 205. The motion-vector memory 312 receives the error signals output by the error memory unit 208, and stores the motion vectors calculated by the motion-vector calculator 307 in response to these signals.

The motion-vector calculator 307 responds to an error signal from the error memory unit 208 by calculating new motion vectors according to an algorithm that will be described below, referring to the motion vectors stored in the motion-vector memory 312, and combines the calculated motion vectors with the motion vectors received from the motion-vector decoder 202 for output to the picture predictor 203.

Figure 12:
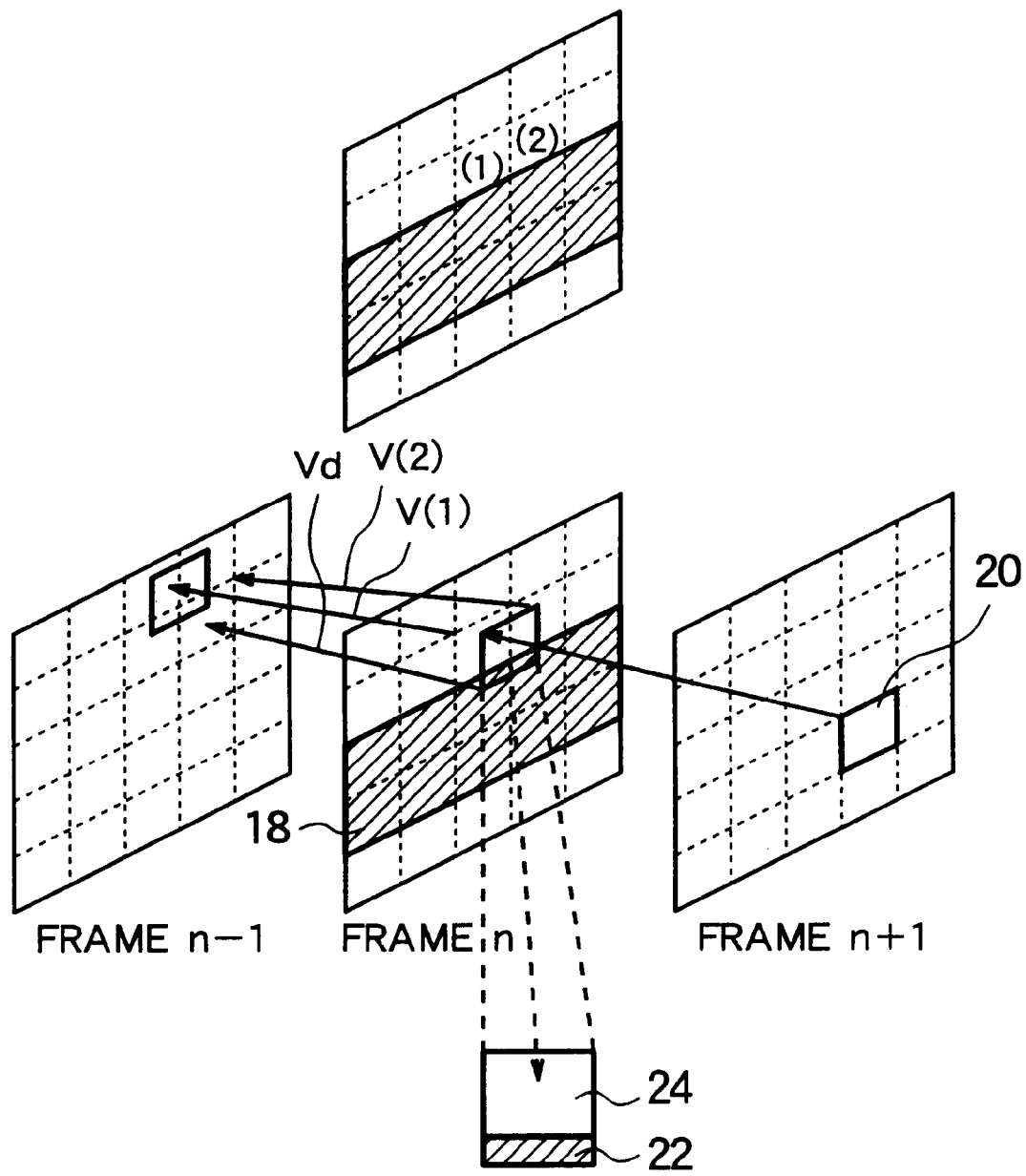
FIG. 12 illustrates the operation of the second embodiment.

FIG. 12 illustrates the operation of the second embodiment. The shaded part of frame n again represents a slice that could not be decoded correctly. When the indicated macroblock in the next frame (n+1) is decoded, the motion vector V points to an area disposed partly in the undecodable slice of frame n, and partly in two macroblocks (1) and (2) that were decoded without error in frame n. These two decodable macroblocks (1) and (2) in frame n have respective motion vectors V(1) and V(2), which are stored in the motion-vector memory 312. As in the first embodiment, the undecodable reference pixels 22 in frame n are replaced by pixels from frame n−1. The decodable reference pixels 24 are not replaced.

To extend the motion vector V of the macroblock 20 being decoded back to frame n−1, the motion-vector calculator 307 in the second embodiment adds a weighted sum of the motion vectors V(1) and V(2) to the motion vector V. The weights a(1) and a(2) are proportional to the areas in macroblocks (1) and (2) occupied by reference pixels for the macroblock 20 being decoded in frame n+1. The sum of the weights a(1) and a(2) is unity. The calculation formula can be written as follows.

$$Vd = V + a(1)V(1) + a(2)V(2)$$

Since V is used as an initial value of Vd, the calculation formula can also be written as follows.

$$Vd = Vd + a(1)V(1) + a(2)V(2)$$

In the general case, reference pixels for the macroblock 20 currently being decoded may be located in any number m of decodable macroblocks in frame n, and the calculation formula becomes the following.

$$Vd = Vd + a(1)V(1) + a(2)V(2) + \ldots + a(m)V(m)$$

where V(1), . . . , V(n) are the motion vectors of the m macroblocks in frame n, and a(1), . . . , a(m) are weights proportional to the occupation ratios of the m macroblocks.

If the motion vector V of the macroblock being decoded points to an area in frame n that is entirely undecodable, the above method of extending the motion vector cannot be applied, so the method of the first embodiment is used instead.

The operation of the second embodiment will now be described with reference to the flowchart in FIG. 13. This operation is carried out for each pixel of the macroblock being decoded.

First, the motion vector V supplied by the motion-vector decoder 202, pointing to a location in the preceding frame, is assigned as the initial value of the calculated motion vector Vd, and the frame number (n) of the preceding frame is assigned as the initial value of the reference frame number Fr (step B1). Next, the reference pixel in frame Fr indicated by the calculated motion vector Vd is checked, using the information stored in the error memory unit 208 (step B2). If this reference pixel is in a macroblock or slice that could not be decoded because of an error, the decoded-picture memory 205 is checked to see whether the frame preceding frame Fr is still stored in one of the frame storage areas 209 (step B3). If this frame (frame Fr−1) is still stored, it is made the new reference frame by subtracting one from Fr (step B4).

Next, the motion vector Vd, which still points into the old reference frame, is checked to see if it maps any part of the macroblock currently being decoded into a previous macroblock that was correctly decoded and thus supplies usable motion vectors pointing into the new reference frame (step B5). If this is the case, then the motion vector Vd is recalculated according to the equation given above, by adding a weighted sum of motion vectors stored in the motion-vector memory 312, to obtain a motion vector pointing into the new reference frame, which is now identified as frame Fr (step B6). If this is not the case, then the motion vector Vd is recalculated by the method used in the first embodiment (step B7). Following step B6 or B7, the procedure returns to step B2. The loop from step B2 to steps B6 and B7 is repeated until a 'no' result is obtained in step B2 or step B3.

When a 'no' result is obtained in step B2 or step B3, the value of the reference pixel indicated by motion vector Vd in frame Fr is placed in the predicted macroblock being constructed for use in decoding the current macroblock.

Figure 13:
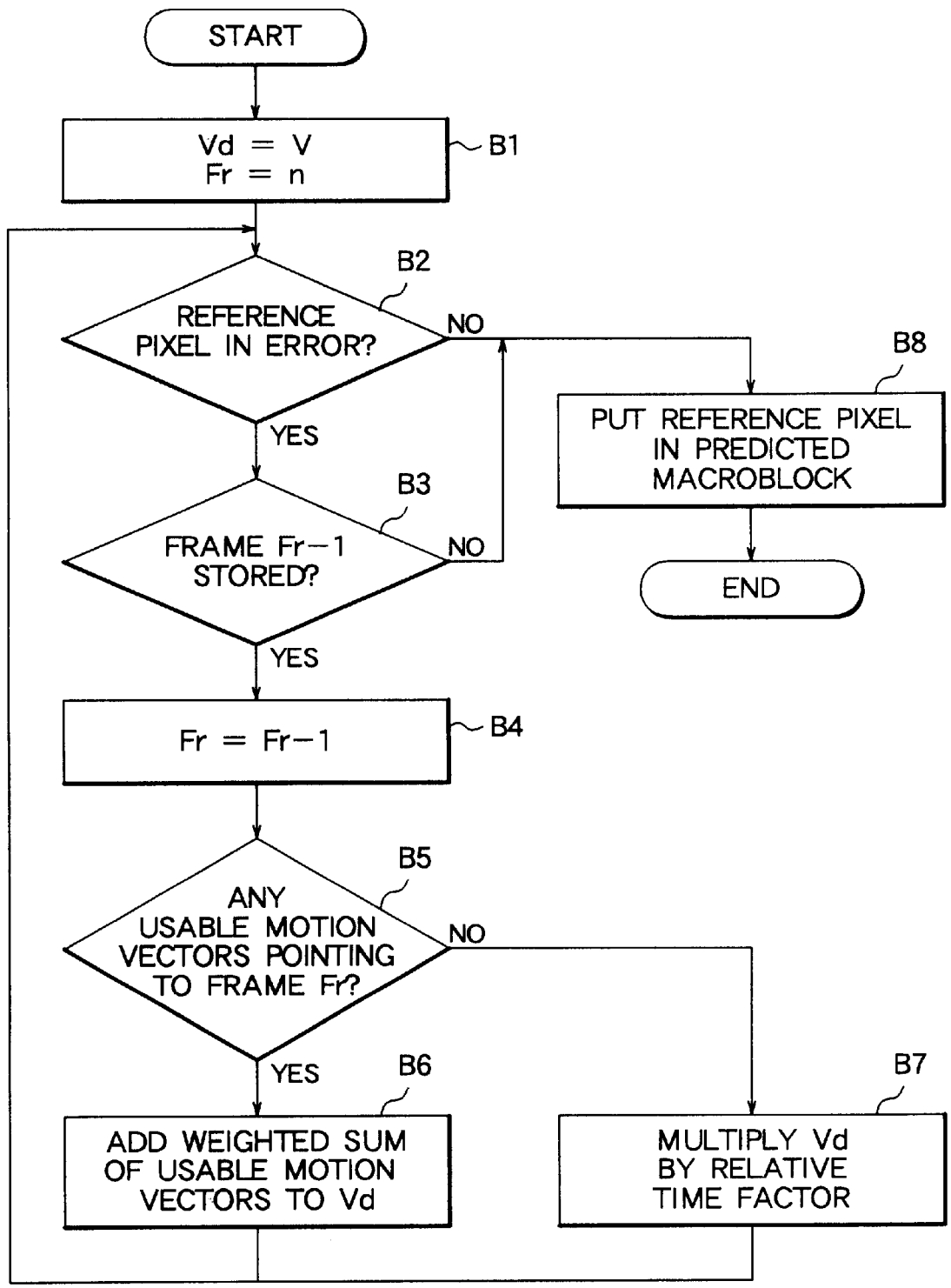
FIG. 13 is a flowchart further illustrating the operation of the first embodiment.

Steps B1 and B6 in FIG. 13 are carried out by the picture predictor 203. Step B2 is carried out by the picture predictor 203 and error memory unit 208. Steps B3, B4, and B5 are carried out by the error memory unit 208. Steps B6 and B7 are carried out by the motion-vector calculator 307.

The second embodiment can reduce or eliminate the propagation of distortion caused by decoding errors even when the objects in the picture do not move at uniform linear velocities. By tracing the motion vectors backward in time, the second embodiment can track any type of past motion accurately.

In the embodiments described above, decoding error signals were generated by the bit-stream decoder 200, prediction-error decoder 201, and motion-vector decoder 202, but the invention is not limited to the use of these particular error signals. If a device external to the decoding apparatus is capable of detecting errors, error signals from this external device can also be used.

In the first embodiment, motion vector Vd was calculated by multiplying the original motion vector V by a relative time factor, but the same result can be obtained in other ways, such as by adding the value of V each time the motion vector is extended one frame farther back.

In the second embodiment, the motion-vector calculation performed in step B6 can be modified by combining the result of this calculation with the result of the calculation performed in the first embodiment, using weighting coefficients b1 and b2 to mix the two results. The equation given above is modified as follows.

$$Vd=b1\{Vd+a(1)V(1)+a(2)V(2)+\ldots+a(m)V(m)\}+b2\{(TRd-TRr)/(TRd-TRp)\}V$$

The weights $a(1), \ldots, a(m)$ are not necessarily proportional to the occupation ratios of the macroblocks; weights can be determined in other ways.

The capacity of the motion-vector memory 312 does not have to be adequate to store motion vectors for all frames stored in the decoded-picture memory 205. If the motion-vector memory 312 has a smaller capacity, then when the necessary motion vectors are unavailable, the motion-vector calculator 307 can revert to the motion-vector calculation method of the first embodiment.

The procedures shown in FIGS. 9 and 13 can be carried out just once for each macroblock, instead of individually for each pixel. In this case, each macroblock in the predicted frame is filled with pixel values from a single previous frame. In FIGS. 8 and 12, all pixels in macroblock 20 in predicted frame n+1 are taken from frame n−1, instead of being taken partly from frame n and partly from frame n−1.

The adder 204 can be replaced by a subtractor or other arithmetic unit, depending on how the prediction errors are coded.

The invention can be practiced in either hardware or software.

Those skilled in the art will recognize that further variations are possible within the scope claimed below.

What is claimed is:

1. A method of decoding a moving picture coded by inter-frame coding with motion compensation, comprising the steps of:

(a) storing at least two previously decoded frames of said moving picture;

(b) storing information identifying parts of said previously decoded frames that could not be decoded correctly;

(c) for each decodable part of a current frame of said moving picture, calculating a motion vector indicating a correctly decoded part of one of said previously decoded frames;

(d) constructing a predicted frame, each part of the predicted frame corresponding to a part of said current frame, each said part of the predicted frame being identical to the correctly decoded part indicated by the motion vector calculated for the corresponding part of the current frame; and (e) decoding said current frame with reference to said predicted frame.

2. The method of claim 1, wherein said step (c) further comprises the steps of:

(f) initializing said motion vector to a received value indicating a part of a most recent one of said previously decoded frames;

(g) extending said motion vector back to a next-most-recent one of said previously decoded frames, if the part indicated by said motion vector could not be decoded correctly; and (h) repeating said step (g) until a correctly decoded part is indicated by said motion vector.

3. The method of claim 2, wherein said step (g) further comprises the step of:

(i) multiplying the received value of said motion vector by a factor determined from an elapsed time from said most recent one of said previously decoded frames to said current frame, and an elapsed time from said next-most-recent one of said previously decoded frames to said current frame.

4. The method of claim 2, wherein said step (g) further comprises the step of:

(j) storing motion vectors received with said previously decoded frames; and (k) using the stored motion vectors to extend said motion vector back to said next-most-recent frame.

5. The method of claim 4, wherein said step (k) includes taking a weighted average of said stored motion vectors.

6. The method of claim 4, wherein said step (g) further comprises the steps of:

(l) determining whether said motion vector currently indicates any correctly decoded parts;

(m) carrying out step (k) if said motion vector currently indicates any correctly decoded parts, using the stored motion vectors of said correctly decoded parts; and (n) multiplying the received value of said motion vector by a factor determined from an elapsed time from said most recent one of said previously decoded frames to said current frame, and an elapsed time from said next-most-recent one of said previously decoded frames to said current frame, if said motion vector does not currently indicate any correctly decoded parts.

7. A decoding apparatus for decoding a moving picture coded by inter-frame coding with motion compensation, comprising:

a decoded-picture memory storing at least two previously decoded frames of said moving picture;

an error memory unit storing information identifying parts of said previously decoded frames that could not be decoded correctly;

a motion-vector calculator coupled to said error memory unit calculating a motion vector indicating a correctly decoded part of one of said previously decoded frames, for each part of a current frame of said moving picture;

a picture predictor coupled to said decoded-picture memory and said motion-vector calculator, constructing a predicted frame, each part of the predicted frame corresponding to a part of said current frame, each said part of the predicted frame being identical to the correctly decoded part indicated by the motion vector calculated for the corresponding part of said current frame; and an arithmetic unit coupled to said picture predictor, decoding said current frame with reference to said predicted frame.

8. The decoding apparatus of claim 7, wherein said motion-vector calculator calculates said motion vector by initializing said motion vector to a received value indicating a part of a most recent one of said previously decoded frames, extending said motion vector back to a next-most-recent one of said previously decoded frames if the indicated part could not be decoded correctly, and repeating this process of extending until a correctly decoded part is indicated.

9. The decoding apparatus of claim 8, wherein said motion-vector calculator multiplies the received value of said motion vector by a factor determined from an elapsed time from said most recent one of said previously decoded frames to said current frame, and an elapsed time from said next-most-recent one of said previously decoded frames to said current frame.

10. The decoding apparatus of claim 8, further comprising a motion-vector memory storing motion vectors received with said previously decoded frames, wherein said motion-vector calculator uses the motion vectors stored in said motion-vector memory to extend said motion vector back to said next-most-recent frame.

11. The decoding apparatus of claim 10, wherein said motion-vector calculator takes a weighted average of said stored motion vectors.

12. The decoding apparatus of claim 10, wherein said motion-vector calculator determines whether said motion vector currently indicates any correctly decoded parts, uses the motion vectors stored in said motion-vector memory to extend said motion vector back to said next-most-recent frame if said motion vector currently indicates any correctly decoded parts, and multiplies the received value of said motion vector by a factor determined from an elapsed time from said most recent one of said previously decoded frames to said current frame, and an elapsed time from said next-most-recent one of said previously decoded frames to said current frame, if said motion vector does not currently indicate any correctly decoded parts.

\* \* \* \* \*